United States Patent
Madasu et al.

(10) Patent No.: US 10,970,620 B2
(45) Date of Patent: Apr. 6, 2021

(54) OPTIMIZING PRODUCTION USING DESIGN OF EXPERIMENT AND RESERVOIR MODELING

(71) Applicant: Halliburton Energy Services, Inc., Houston, TX (US)

(72) Inventors: Srinath Madasu, Houston, TX (US); Ronald Glen Dusterhoft, Katy, TX (US); Vladimir Nikolayevich Martysevich, Spring, TX (US); Yucel Akkutlu, College Station, TX (US); Brice Y. Kim, Bryan, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 833 days.

(21) Appl. No.: 15/699,531

(22) Filed: Sep. 8, 2017

(65) Prior Publication Data

US 2019/0080224 A1    Mar. 14, 2019

(51) Int. Cl.
*G06N 3/04*    (2006.01)
*E21B 41/00*   (2006.01)
(Continued)

(52) U.S. Cl.
CPC ....... *G06N 3/0445* (2013.01); *E21B 41/0092* (2013.01); *E21B 44/00* (2013.01);
(Continued)

(58) Field of Classification Search
CPC ..... G06N 3/0445; G06N 3/08; E21B 41/0092
See application file for complete search history.

(56) References Cited

U.S. PATENT DOCUMENTS

| 5,299,453 A * | 4/1994 | Sprunt ............... G01N 15/0893 436/31 |
| 2011/0011595 A1* | 1/2011 | Huang ................... E21B 43/00 166/369 |
| 2017/0167964 A1* | 6/2017 | Liu ........................ G01N 33/24 |

FOREIGN PATENT DOCUMENTS

WO    2015108884 A1    7/2015

OTHER PUBLICATIONS

Artun (Artun, E., Ertekin, T., Watson, R., & Miller, B. (2012). Designing cyclic pressure pulsing in naturally fractured reservoirs using an inverse looking recurrent neural network. Computers & geosciences, 38(1), 68-79.) (Year: 2012).*

(Continued)

*Primary Examiner* — Bijan Mapar
(74) *Attorney, Agent, or Firm* — John Wustenberg; C. Tumey Law Group PLLC

(57) ABSTRACT

Historical information about a significant input parameter is stored in a data analytics model of a hydrocarbon reservoir. A historical deep recursive neural network (RNN) model is built based on time-series production data from the hydrocarbon reservoir as a function of the significant input parameter in the data analytics model. The historical deep RNN neural network model is stored on a data storage device. An experiment using the historical deep neural network model is designed to predict the significant input parameter. The experiment is run to produce a significant experimental input parameter. The significant experimental input parameter is compared to the significant input parameter stored in the data analytics model to determine a difference. The data analytics model is adjusted to reduce the difference.

20 Claims, 16 Drawing Sheets

(51) Int. Cl.
 G06N 3/08 (2006.01)
 E21B 44/00 (2006.01)
 E21B 49/02 (2006.01)
(52) U.S. Cl.
 CPC ............... *G06N 3/08* (2013.01); *E21B 49/02* (2013.01); *E21B 2200/22* (2020.05)

(56) References Cited

OTHER PUBLICATIONS

Ahmadi (Ahmadi, R., Shahrabi, J., & Aminshahidy, B. (2017). Automatic well-testing model diagnosis and parameter estimation using artificial neural networks and design of experiments. Journal of Petroleum Exploration and Production Technology, 7(3), 759-783. Published: Nov. 15, 2016) (Year: 2016).*

Demiryurek (Demiryurek, U., Banaei-Kashani, F., Shahabi, C., & Wilkinson, F. G. (Jan. 2008). Neural-network based sensitivity analysis for injector-producer relationship identification. In Intelligent Energy Conference and Exhibition. Society of Petroleum Engineers.) (Year: 2008).*

Bai, Mao, Elsworth, Derek, Roegiers, Jean-Claude, Multiporosity/Multipermeability Approach to the Simulation of Naturally Fractured Reservoirs, Water Resources Research, vol. 29, No. 6, p. 1621-1633, Jun. 1993.

Christie, Michael A., Upscaling for Reservoir Simulation, Distinguished Author Series, Nov. 1996, JPT.

Colah's Blog, Understanding LSTM Networks, Aug. 27, 2015.

Gupta, R., Collinson, R., Smith, G.C., Ryan, S., Louis, J., History Matching of Field Production using Design of Experiments, Society of Petroleum Engineers, 2008 SPE Asia Pacific Oil & Gas Conference and Exhibition, Perth, Australia, Oct. 20-22, 2008.

Langmuir Isotherm, www.fekete.com, fekete Harmony, IHS Inc., 2014.

Mohaghegh, S.D., Quantifying Uncertainties Associated With Reservoir Simulation Studies using Surrogate Reservoir Models, SP 102492, Society of Petroleum Engineers, 2006 SPE Annual Technical Conference and Exhibition, San Antonio, Texas, U.S.A., Sep. 24-27, 2006.

Pinkett, John, Westacott, Donald, Innovative Sidewall Pressure Coring Technology Improves Reservoir Insight in Multiple Applications, SPWLA 57th Annual Logging Symposium, Jun. 25-29, 2016.

* cited by examiner

| Parameters | Lower Limit | Upper Limit | Parameter Distribution | Unit |
|---|---|---|---|---|
| Permeability_F | 0.8 | 1.2 | Uniform in Range | md |
| Permeability_I | 8.00E-05 | 1.20E-04 | Uniform in Range | md |
| Permeability_M | 8.00E-05 | 1.20E-04 | Uniform in Range | md |
| POR_Natural Fracture | 4.00E-03 | 6.00E-03 | Uniform in Range | - |
| POR_Inorganic Matrix | 0.016 | 0.024 | Uniform in Range | - |
| POR_Organic Matrix | 0.024 | 0.036 | Uniform in Range | - |
| LX/LY/LZ_ Fracture-Inorganic | 0.01 | 1 | Uniform in Range | cm |
| LX/LY/LZ_ Inorganic-Organic | 0.01 | 1 | Uniform in Range | cm |
| PC_C1 | 654.44 | 681.16 | Uniform in Range | psia |
| PC_C2 | 693.64 | 721.96 | Uniform in Range | psia |
| TC_C1 | 84.21 | 80.91 | Uniform in Range | ºC |
| TC_C2 | 31.63 | 32.93 | Uniform in Range | ºC |
| Langmuir Pressure_C1 | 400 | 600 | Uniform in Range | psia |
| Langmuir Pressure_C2 | 240 | 360 | Uniform in Range | psia |
| Langmuir Volume_C1 | 1.6 | 2.4 | Uniform in Range | cc/gm |
| Langmuir Volume_C2 | 0.8 | 1.2 | Uniform in Range | cc/gm |

| COMPONENT | MOLWT | OMEGAA | OMEGAB | TC | PC | ZC | ACENTR | VSHIFT |
|---|---|---|---|---|---|---|---|---|
| CO2 | 44.01 | 0.457236 | 0.077796 | 31.05 | 1070.9 | 0.2742 | 0.2225 | -0.1009 |
| N2 | 28.01 | 0.457236 | 0.077796 | -146.89 | 493 | 0.291 | 0.0372 | -0.174 |
| C1 | 16.04 | 0.457236 | 0.077796 | -82.56 | 667.8 | 0.289 | 0.0126 | -0.1546 |
| C2 | 30.07 | 0.457236 | 0.077796 | 32.28 | 707.8 | 0.285 | 0.0978 | -0.074 |
| C3 | 44.1 | 0.457236 | 0.077796 | 96.67 | 616.3 | 0.281 | 0.1541 | -0.0603 |
| IC4 | 58.12 | 0.457236 | 0.077796 | 135 | 529.1 | 0.283 | 0.184 | -0.0798 |
| NC4 | 58.12 | 0.457236 | 0.077796 | 152.06 | 550.7 | 0.274 | 0.2015 | -0.0675 |
| IC5 | 72.15 | 0.457236 | 0.077796 | 187.28 | 490.4 | 0.273 | 0.2286 | -0.064 |
| NC5 | 72.15 | 0.457236 | 0.077796 | 196.5 | 488.6 | 0.262 | 0.2524 | -0.0369 |
| NC6 | 86.18 | 0.457236 | 0.077796 | 234.28 | 436.9 | 0.264 | 0.2998 | -0.0036 |
| C7+ | 177.11 | 0.457236 | 0.077796 | 335.36 | 374.1 | 0.2644 | 0.371 | 0.0855 |

Fig. 11

| Parameters | Lower Limit | Base Value | Upper Limit | Parameter Distribution | Unit |
|---|---|---|---|---|---|
| Permeability_F | 0.8 | 1 | 1.2 | Uniform in Range | md |
| Permeability_I | 8.00E-05 | 1.00E-04 | 1.20E-04 | Uniform in Range | md |
| Permeability_M | 8.00E-05 | 1.00E-04 | 1.20E-04 | Uniform in Range | md |
| POR_Natural Fracture | 4.00E-03 | 5.00E-03 | 6.00E-03 | Uniform in Range | - |
| POR_Inorganic Matrix | 0.016 | 0.02 | 0.024 | Uniform in Range | - |
| POR_Organic Matrix | 0.024 | 0.03 | 0.036 | Uniform in Range | - |
| LX/LY/LZ_Fracture-Inorganic | 0.01 | 0.1 | 1 | Uniform in Range | cm |
| LX/LY/LZ_Inorganic-Organic | 0.01 | 0.1 | 1 | Uniform in Range | cm |
| PC_C1 | 654.44 | 667.8 | 681.16 | Uniform in Range | psia |
| PC_C2 | 693.64 | 707.8 | 721.96 | Uniform in Range | psia |
| TC_C1 | -84.21 | -82.56 | -80.91 | Uniform in Range | °C |
| TC_C2 | 31.63 | 32.28 | 32.93 | Uniform in Range | °C |
| Langmuir Pressure_C1 | 400 | 500 | 600 | Uniform in Range | psia |
| Langmuir Pressure_C2 | 240 | 300 | 360 | Uniform in Range | psia |
| Langmuir Volume_C1 | 1.6 | 2 | 2.4 | Uniform in Range | cc/gm |
| Langmuir Volume_C2 | 0.8 | 1 | 1.2 | Uniform in Range | cc/gm |

Fig. 14

OPTIMIZING PRODUCTION USING DESIGN OF EXPERIMENT AND RESERVOIR MODELING

BACKGROUND

Hydrocarbons are typically produced from reservoirs in the earth. Data, in the form of parameters such as permeability, connectivity, fracture geometry and conductivity and other similar parameters, collected from a reservoir and around the reservoir is often studied to develop and implement procedures to enhance production from the reservoir. Such production enhancement procedures include, but are not limited to, hydraulic fracturing, acidizing, and other such procedures. Production enhancement procedures can be affected by the reservoir, fracture and treatment parameters and can be designed to take into account those parameters. It is a challenge to identify significant parameters, defined to be those reservoir, fracture and treatment parameters that have the most impact on the design of production enhancement procedures, and then to design and implement production enhancement procedures considering the significant parameters.

BRIEF DESCRIPTION OF THE DRAWINGS

FIG. 5 is an example table of reservoir parameters available for the Design of Experiments (DOE).

FIG. 6 is an example table of experiments for a DOE.

FIG. 11 is a table listing the typical composition of fluids from the Eagle Ford Shale.

FIG. 14 is a table showing the model parameters listed in FIG. 5 with the addition of a base value for each model parameter.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

The technique described herein provides a coupled experimental, data analytics and modeling framework through Design of Experiments (DOE) that offers improved and an efficient methodology to study the significant and effective parameters for production enhancement. The methodology aids in increasing production by screening the reservoir, fracture and treatment parameters and further utilizing the reservoir, fracture and treatment parameters for modeling or data analytics to input to the DOE.

The technique is a methodology/workflow to predict and refine significant parameters required for production optimization utilizing DOE. The reservoir flow modeling has the ability to utilize the significant parameters as inputs into the software and the model provides information on production. The experiments can measure the production for the cores sampled from the borehole and utilize the results to history match the desired properties. This information can be helpful in planning subsequent jobs and can also be utilized in a multi-scale upscaling reservoir model. The technique uses (i) a DOE approach, (ii) assisted history matching using a DOE surrogate model and a reservoir model, and (iii) reservoir upscaling and sensitivity to highlight critical reservoir, fracture and treatment properties for the DOE through data analytics.

Figure 1:
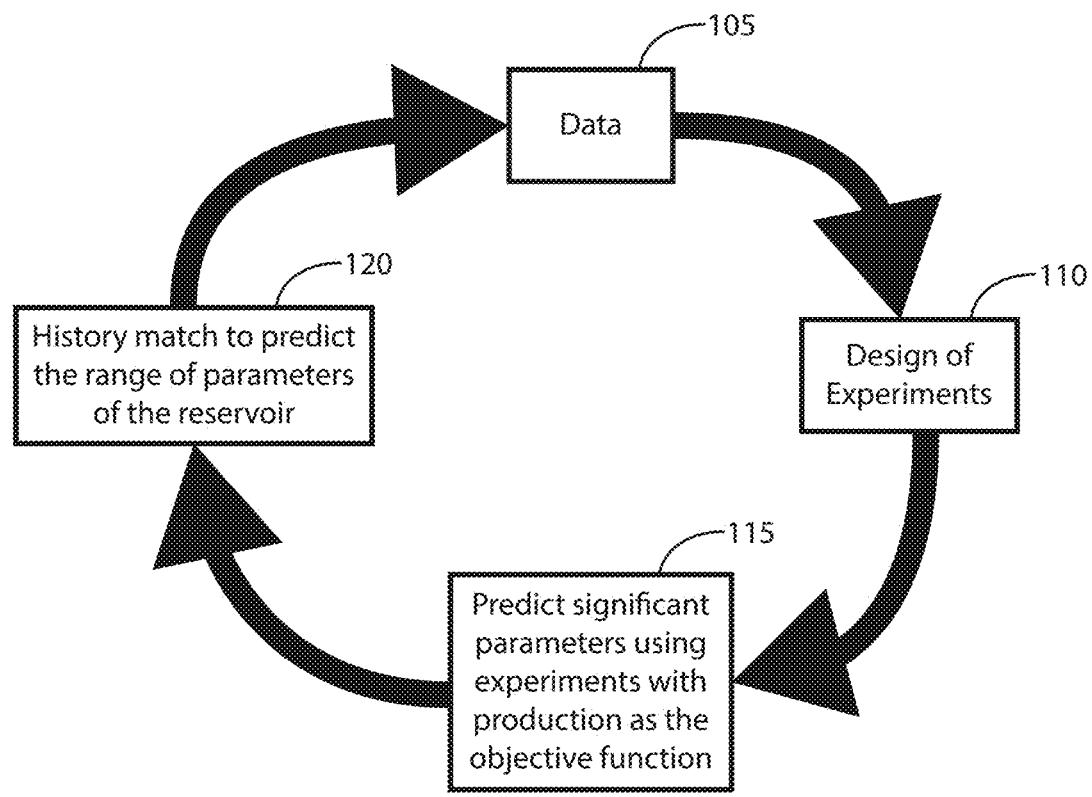
FIG. 1 is a schematic of a technique to identify the significant parameters for production enhancement.

FIG. 1 is a schematic of a technique to identify the significant parameters for production enhancement. Data initially collected from the reservoir (block 105) is used in a DOE process (block 110). The DOE (block 110) is used to predict significant parameters using experiments with production as the objective function (block 115), i.e., the function being maximized. That is, the goal of the technique is to maximize production. The predicted significant parameters (output from block 115) are used to match with historical data to predict the range of parameters of the reservoir (block 120). The results of this process are used to adjust the data in block 105.

It can be difficult to reliably estimate reservoir parameters for statistical models due to the highly non-linear nature of inter-relationships among the variables and the presence of noise (i.e., measurement errors). The technique described herein uses a deep-learning based, end-to-end approach. Multi-step prediction problems have computational issues as the size of the search space grows exponentially. Also, the data to characterize hydrocarbon reservoirs is temporal in nature and the temporal correlations within the data can be exploited to make predictions.

Figure 2:
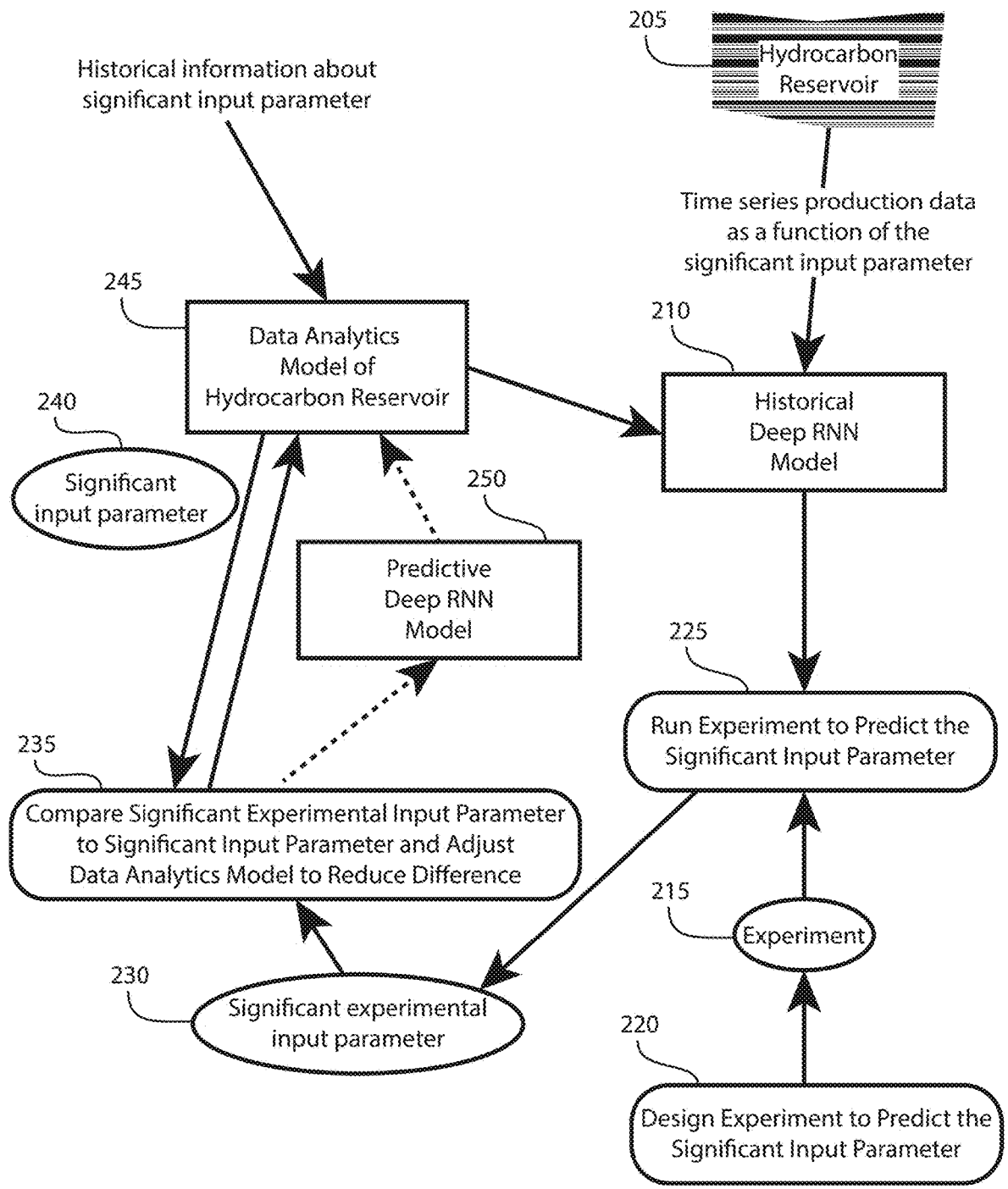
FIG. 2 is a block diagram of a process to perform the technique illustrated in FIG. 1 using multivariate deep recursive neural networks (deep RNN).

FIG. 2 is a block diagram of a process to perform the technique illustrated in FIG. 1 using multivariate deep recursive neural networks (deep RNNs). The problem of reliably estimating reservoir parameters for statistical models is formulated as a multivariate time-series prediction problem. The model for providing the predictions is based upon a multivariate deep RNN. Data is collected from a hydrocarbon reservoir 205 as time-series production data collected as a function of a significant input parameter and used as an input to a historical deep RNN model 210. In parallel, an experiment 215 is designed to predict the significant input parameter (block 220). The experiment 215 is run 225 to produce a significant experimental input parameter 230. The significant experimental input parameter 230 is then compared 235 to a corresponding significant input parameter 240 from a data analytics model of the hydrocarbon reservoir 245 and the data analytics model of the hydrocarbon reservoir 245 is adjusted (also included in block 235) to reduce the difference between the significant experimental input parameter 230 and the corresponding significant input parameter 240. In one or more embodiments, the data analytics model of the hydrocarbon reservoir 245 includes historical information about the significant input parameter 240. In one or more embodiments, the time-series production data produced from the hydrocarbon reservoir 205 is stored in the data analytics model 245 and the data analytics model 245 is used as an input to the historical deep RNN model 210. In one or more embodiments, a predictive deep RNN model 250 is optionally used to adjust the data analytics model 245 to reduce the difference between the significant experimental input parameter 230 and the significant input parameter 240.

Figure 3:
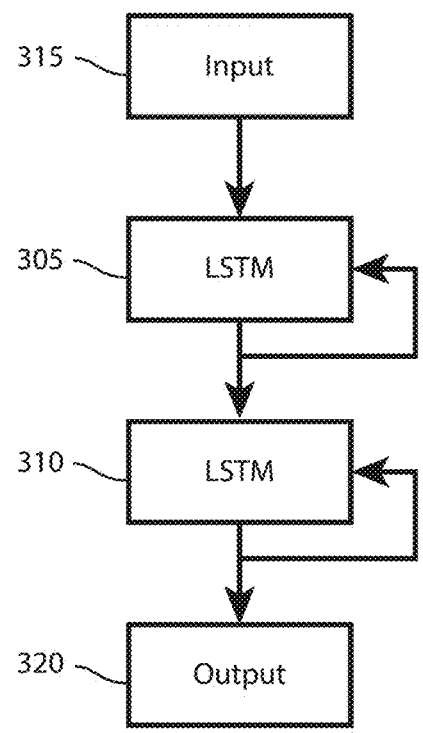
FIG. 3 is a block diagram of a deep RNN that includes stacked long short-term memory (LSTM) cells.

FIG. 3 is a block diagram of a deep RNN that includes stacked long short-term memory (LSTM) cells. In one or more embodiments, the historical deep RNN model 210 and/or the predictive deep RNN model 250 include stacked LSTM cells 305, 310 or an LSTM variant, e.g. gated recurrent units (GRU). An input 315 is provided to LSTM cell 305. The output of LSTM cell 305 is provided to LSTM cell 310 and is also fed back to LSTM cell 305 as an input. The output of LSTM cell 310 is provided as an output 320 and is also fed back to LSTM cell 310 as an input. Predefined fractions of multistage treatment data are used for training the historical deep RNN model 210 and/or the predictive deep RNN model 250, along with another fraction for simultaneous validation of the trained historical deep RNN model 210 and/or the predictive deep RNN model 250. Data not used during training and validation is designated as "hold-out" test data, which is used for quantifying trained model efficacy on the previously unseen data. In one or more embodiments, the historical deep RNN model 210 and/or the predictive deep RNN model 250 include more than two LSTMs.

Figure 4:
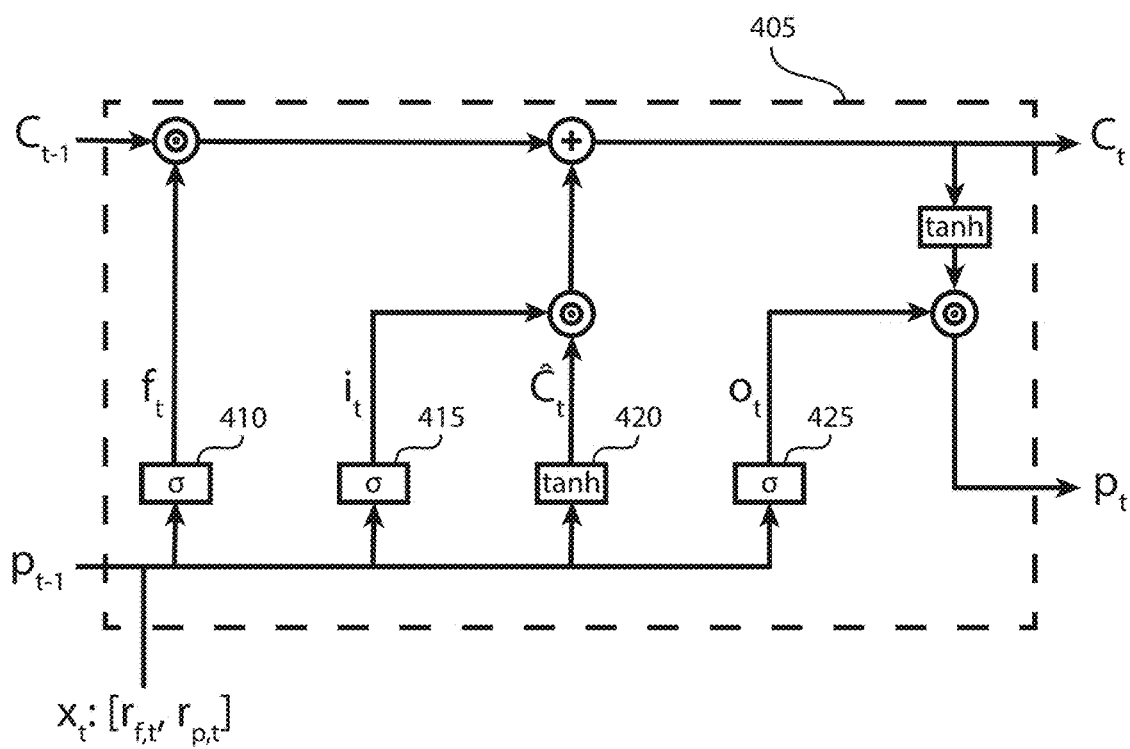
FIG. 4 is a schematic showing the inner working of an individual LSTM cell.

FIG. 4 is a schematic showing the inner working of an individual LSTM cell. In an LSTM cell 405, which is representative of the LSTM cell 305 or the LSTM cell 310, $C_{t-1}$ and $p_{t-1}$ are the cell state and the output production, respectively, from the previous time step. $x_t$ is the multivariate input for the current time step, which includes, for example, permeability ($r_{f,t}$), and proppant conductivity ($r_{p,t}$) from the current and previous time steps within a predefined look-up window of the LSTM. The multivariate input itself consists of the independent variables, which are functions of time, and can be calculated before starting the treatment based upon the treatment design. The LSTM cell 405 has 4 layers: (1) a "forget" layer associated with a forget gate 410, (2) an "input" layer associated with input gate 415, (3) a "cell" layer associated with cell gate 420, and (4) an "output" layer associated with the output gate 424. Each of the layers has associated weights and biases, which are trained during the training process to provide optimal predictions of the production in the time series. $f_t$, $i_t$, and $o_t$ are the outputs of the forget gate 410, input gate 415, and output gate 425, respectively. The forget gate 410, input gate 415, and output gate 425 involve a sigmoid function (σ), resulting in a value in the range [0, 1]. These values define how much of the information should be passed from the previous time step to the next time step. In one or more embodiments, the following example mathematical operations are performed at time step t to calculate the cell state $C_t$ and output production $p_t$:

$$x_t=[r_{f,t},r_{p,t}] \quad (1)$$

$$f_t=\sigma(W_f\cdot[p_{t-1},x_t]+b_f) \quad (2)$$

$$i_t=\sigma(w_i\cdot[p_{t-1},x_t]+b_i) \quad (3)$$

$$\widehat{C}_t=\tanh(W_C\cdot[p_{t-1},x_t]+b_C) \quad (4)$$

$$C_t=f_t\odot C_{t-1}+i_t\odot \widehat{C}_t \quad (5)$$

$$o_t=\sigma(W_O\cdot[p_{t-1},x_t]+b_O) \quad (6)$$

$$p_t=o_t\odot \tanh(C_t) \quad (7)$$

where:
$W_f$ is a forget weight,
$b_f$ is a forget bias,
$W_i$ is an input weight,
$b_i$ is an input bias,
$W_c$ is a cell weight,
$b_c$ is a cell bias,
$W_o$ is an output weight,
$b_o$ is an output bias,
$\odot$ is a multiplication operator, and
tanh is the hyperbolic tangent function.

In the configuration shown in FIG. 3, the cell state $C_t$ and output production $p_t$ are fed back to the inputs $C_{t-1}$ and $p_{t-1}$, respectively, for LSTM cells 305 and 310.

Design of Experiment

FIG. 5 is an example table of reservoir parameters available for the DOE. Each parameter is listed, along with a lower limit, an upper limit, a parameter distribution, and a unit. The units shown on the example table are millidarcys (md), centimeters (cm), pounds per square inch absolute (psia), degrees Centigrade (° C.), and cubic centimeter per gram (cc/gm).

The parameters shown in FIG. 5 are:
Permeabilty_F, which is the fracture permeability,
Permeability_I, which is the inter-matrix permeability,
Permeability_M, which is the matrix permeability,
POR_Natural Fracture, which is the porosity of the natural fracture,
POR_Inorganic Matrix, which is the porosity of the inorganic matrix,
POR_Organic Matrix, which is the porosity of the organic matrix,
LX/LY/LZ_Fracture-Inorganic, which is the length along the x, y, and z axes of the inorganic fracture,
LX/LY/LZ_Inorganic-Organic, which is the length along the x, y, and z axes of the inorganic fracture,
PC_C1, which is the critical pressure for the first hydrocarbon produced,
PC_C2, which is the critical pressure for the second hydrocarbon produced,
TC_C1, which is the critical temperature for the first hydrocarbon produced,
TC_C2, which is the critical temperature for the second hydrocarbon produced,
Langmuir Pressure_C1, which is the Langmuir pressure for the first hydrocarbon produced, Langmuir Temperature_C1, which is the Langmuir temperature for the first hydrocarbon produced, Langmuir Pressure_C2, which is the Langmuir pressure for the second hydrocarbon produced, and Langmuir Temperature_C2, which is the Langmuir temperature for the second hydrocarbon produced.

The table in FIG. 5 also includes a lower limit for the parameter, an upper limit for the parameter, and a parameter distribution for each of the parameters.

Figure 6:
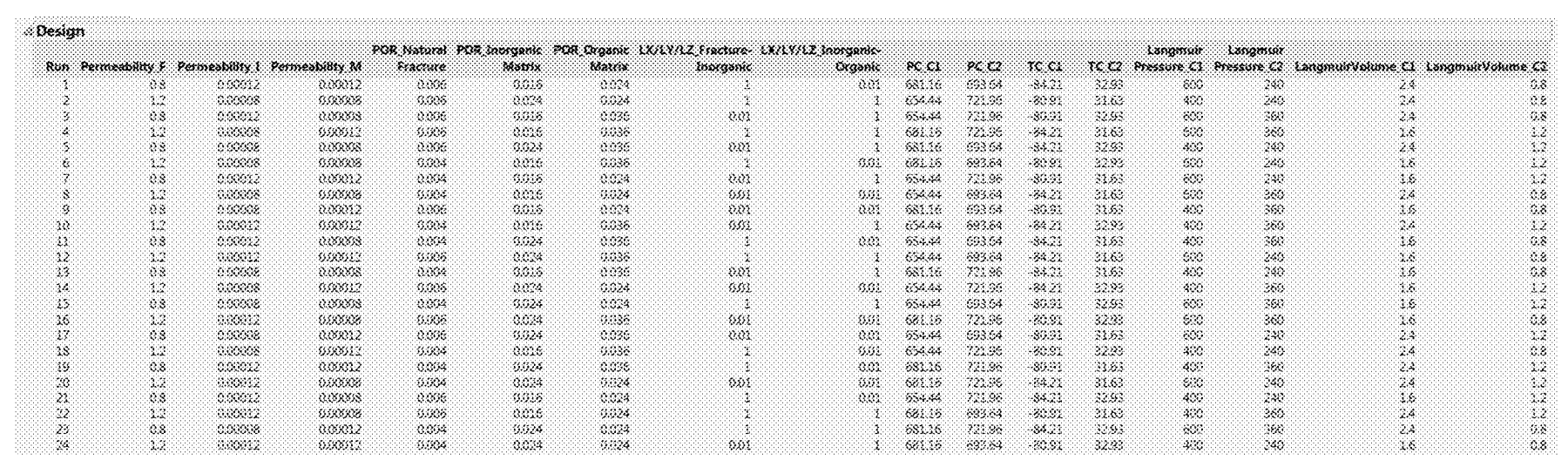

FIG. 6 is an example table of experiments for a DOE. As can be seen the design has 24 experiments. Each of the parameter values is individually varied for the experiments. For example, Permeability_F has the value of 0.8 md for each of the odd-numbered experiments and 1.2 for each of the even-numbered experiments; Permeability_I has the value of 0.00012 md for some experiments and 0.00008 md for other experiments; etc.

The experiments, such as those shown in the example in FIG. 5, are selected to explore the interdependencies between parameters and to identify the significant parameters.

In one example, the DOE Surrogate or Proxy Model is:

$$\begin{aligned}\text{Production} =\ &a*\text{Permeability\_F} + b*\text{Permeability\_I} + \\ &c*\text{Permeability\_M} + d*\text{POR\_Natural Fracture} + \\ &e*\text{POR\_Inorganic Matrix} + f*\text{POR\_Organic Matrix} + \\ &g*\ LX/LY/LZ\_\text{Fracture-Inorganic} + h*LX/LY/LZ\_\text{Fracture-Organic} + i*PC\_C1 + j*PC\_C2 + \\ &k*\ TC\_C1 + 1*TC\_C2 + \\ &m*\text{Langmuir\_Pressure\_C1} + \\ &n*\text{Langmuir\_Pressure\_C2} + o*\\ &\text{Langmuir\_Volume\_C1} + \\ &p*\text{Langmuir\_Volume\_C2}\end{aligned} \quad (8)$$

where a-p are constants that are determined during the compare and adjust process 235 shown in FIG. 2; in one or more embodiments, the a-p constants are stored in the data analytics model 245.

Figure 7:
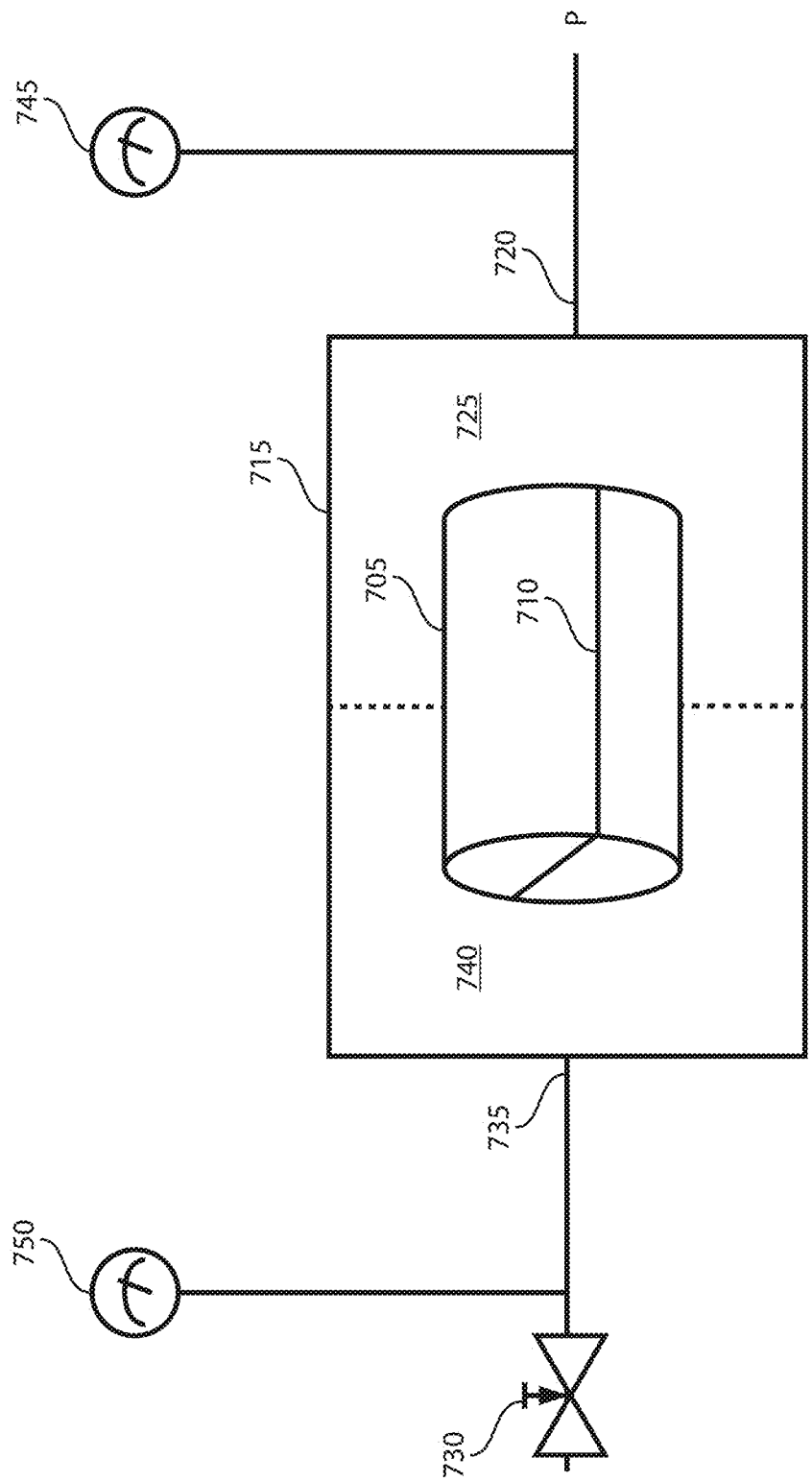
FIG. 7 shows an example test environment for gathering time-series production data from a core sample collected from a reservoir.

FIG. 7 shows an example test environment for gathering time-series production data from a core sample collected from a reservoir. In one or more embodiments, a sample 705 is collected from a reservoir using the COREVAULT® tool and system available from Halliburton. The COREVAULT® tool and system, described in John Pinkett, Donald Westacott, "Innovative Sidewall Pressure Coring Technology Improves Reservoir Insight in Multiple Applications," presented at the Society of Petrophysicists and Well Log Analysts (SPWLA) Annual Logging Symposium held in Reykajavik, Icelandm Jun. 25-29, 2016, uses a wireline tool to extract core samples at selected depths in a borehole. The core samples are deposited in a high-pressure vessel in the tool. The high-pressure vessel is pre-filled at the surface with an inert gas such that the fluids within the sample and the pressures on the sample are preserved until the sample 705 is tested at a laboratory. In one or more embodiments, the COREVAULT® tool's high-pressure vessel is 1.83 inches in diameter and 31.9 inches long. Typically, core samples are 1.5 inches in diameter and 2.25 inches long, so that the pressure vessel can contain 10 core samples.

In one or more embodiments, the sample 705 is split or cut along a crack 710 to simulate a fracture in the formation.

In one or more embodiments, the sample 705 is placed in a test fixture 715, such as a Hassler chamber. The test fixture 715 includes an input 720 through which pressure can be applied to an input side 725 of the test fixture 715, a valve 730 coupled to an output 735 by which pressure can be released from an output side 740 of the test fixture 715, an input pressure sensor 745 to measure the pressure on the input side 725 of the test fixture 715, an output pressure sensor 750 to measure the pressure on the output side 740 of the test fixture 715.

Figure 8:
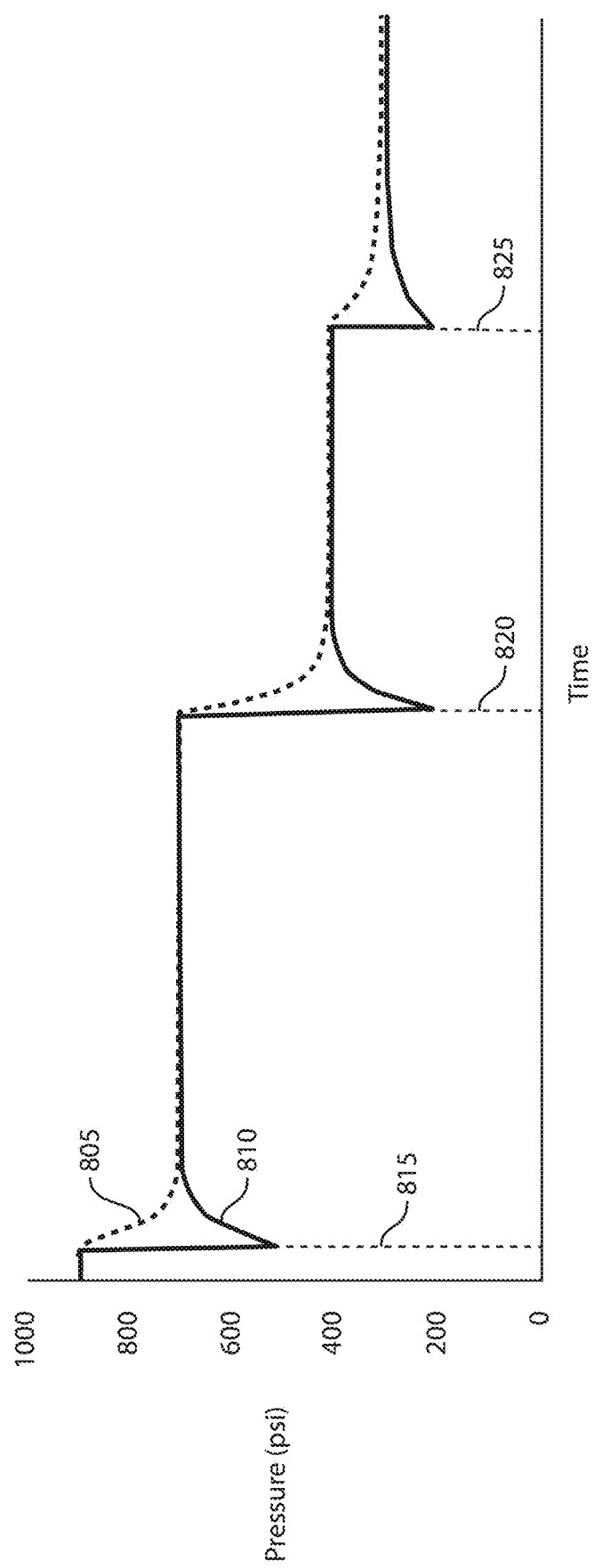
FIG. 8 is a chart showing pressure transient data for sandstone.

FIG. 8 is a chart showing pressure transient data for sandstone. In FIG. 8, the vertical axis is pressure and the horizontal axis is time. A sandstone sample has been inserted in the test fixture 715 as the sample 705. The input pressure, as measured by the input pressure sensor 745, is shown as the dashed line 805 and the output pressure, as measured by the output pressure sensor 750, is shown by the solid line 810. As can be seen, at the beginning of the process the input pressure is raised to approximately 900 psi and the output pressure is allowed to equalize at that same pressure. The valve 730 is opened at time 815 causing the output pressure to drop, creating a pressure transient. The input pressure falls slowly and the output pressure rises slowly as the output side 740 of the test fixture re-pressurizes through the sample 705. The output pressure 810 curve represents a response to a pressure transient. The same process is followed at times 820 and 825. In addition to pressure, the composition and volume of fluids flowing out of the test fixture 715 through valve 730 are recorded over time. In one or more embodiments, this time-series production data is stored in the data analytics model 245.

Figure 9:
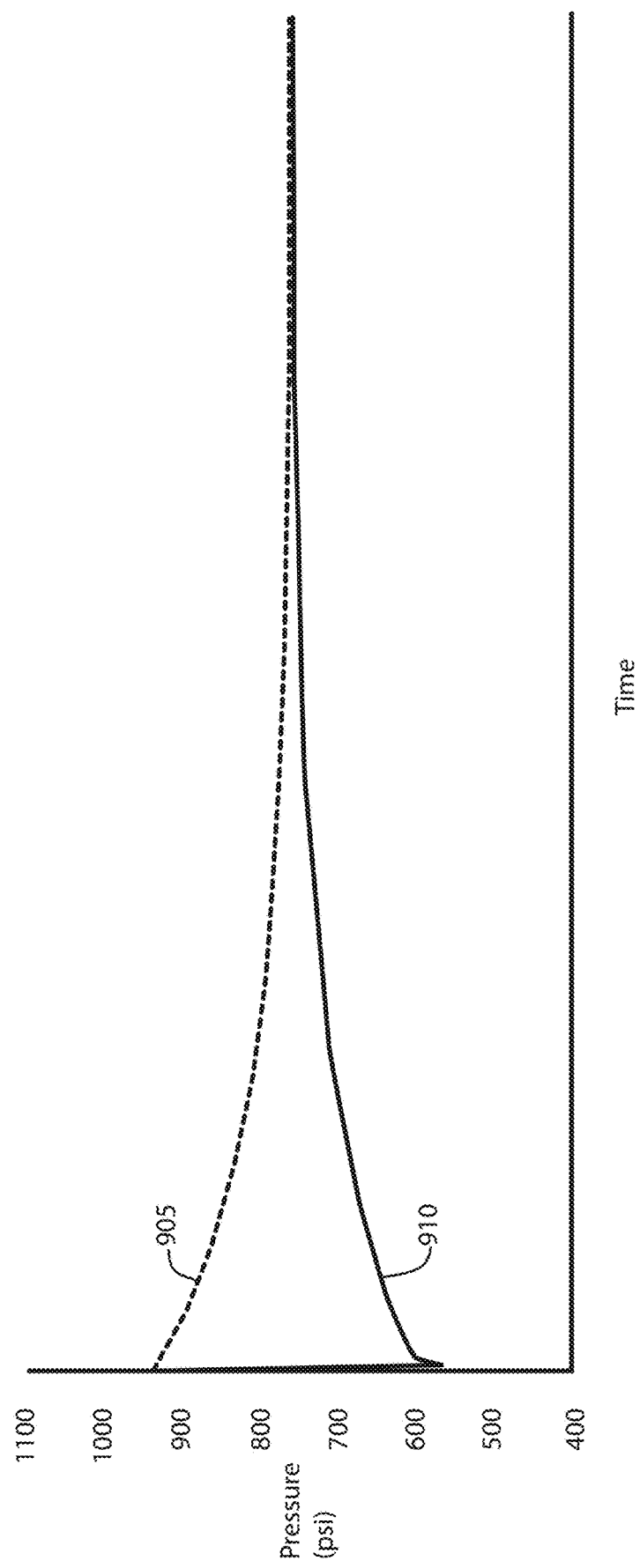
FIG. 9 is a chart showing pressure transient data for Barnett.

FIG. 9 is a chart showing pressure transient data for Barnett. In FIG. 9, the vertical axis is pressure and the horizontal axis is time. A sample from a Barnett outcrop has been inserted in the test fixture 715 as the sample 705. The input pressure, as measured by the input pressure sensor 745, is shown as the dashed line 905 and the output pressure, as measured by the output pressure sensor 750, is shown by the solid line 910. As can be seen, the valve 730 is opened at time zero which causes the output pressure to drop. The input pressure falls slowly and the output pressure rises slowly as the output side 740 of the test fixture re-pressurizes through the sample 705. The output pressure 910 curve represents a response to a pressure transient. In addition to pressure, the composition and volume of fluids flowing out of the test fixture 715 through valve 730 are recorded over time. In one or more embodiments, this time-series production data is stored in the data analytics model 245.

Figure 10:
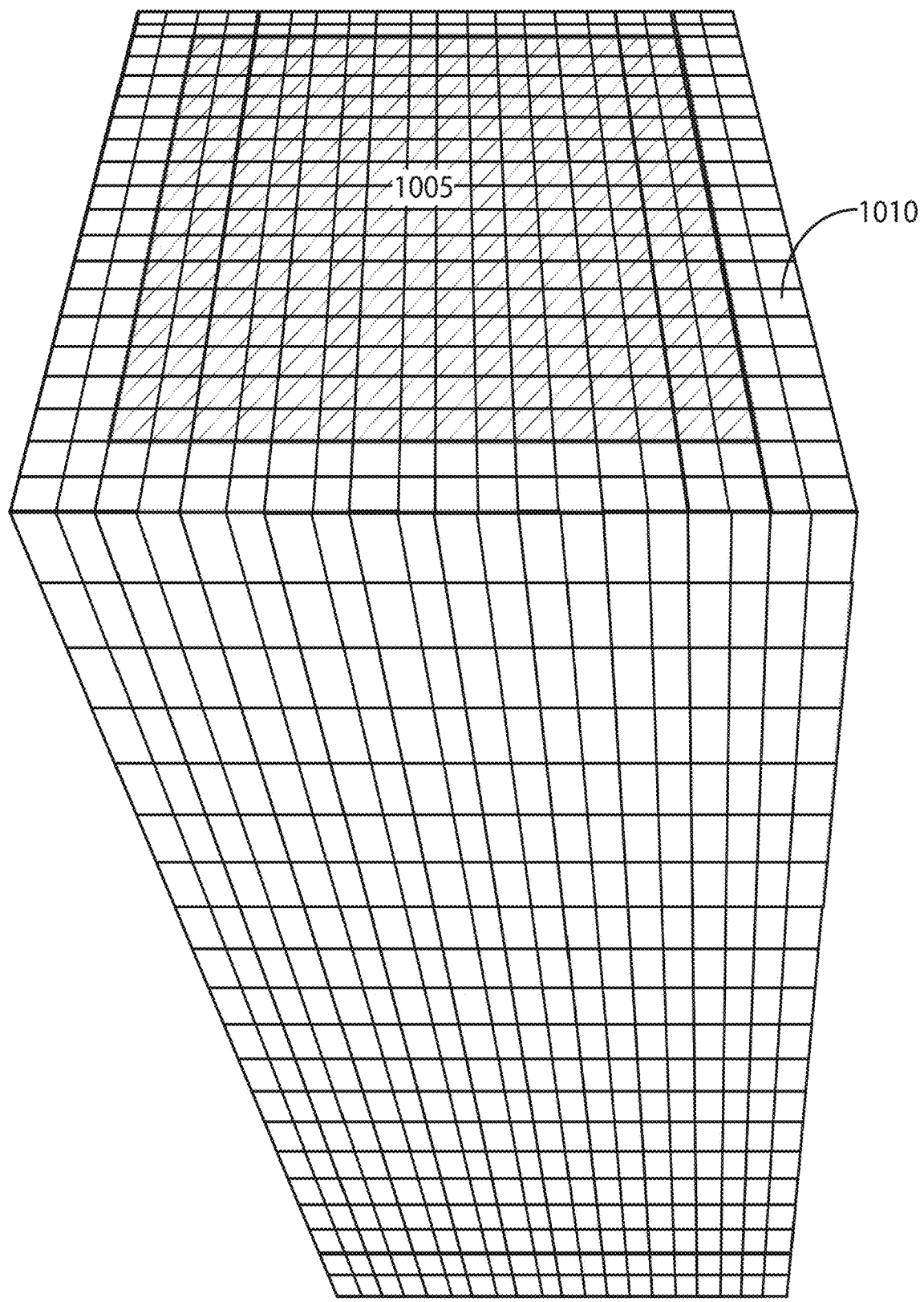
FIG. 10 is a perspective view of a model of a sample in a pressure chamber.

FIG. 10 is a perspective view of a model of a sample in a pressure chamber. In one or more embodiments, the sample in the COREVAULT® tool's pressure vessel is modeled as shown in FIG. 10. The volume 1005 indicated with cross-hatching is a model of the core and the surrounding volume 1010, with no cross-hatching, is the space filled with the inert gas or serum.

FIG. 11 is a table listing the typical composition of fluids from the Eagle Ford Shale. In one or more embodiments, a typical composition of hydrocarbon in Eagle Ford, illustrated in FIG. 11, is used for the simulation of depletion of the core sample shown in FIG. 10. As can be seen, there are 11 components in total including 2 non-hydrocarbon components.

Figure 12:
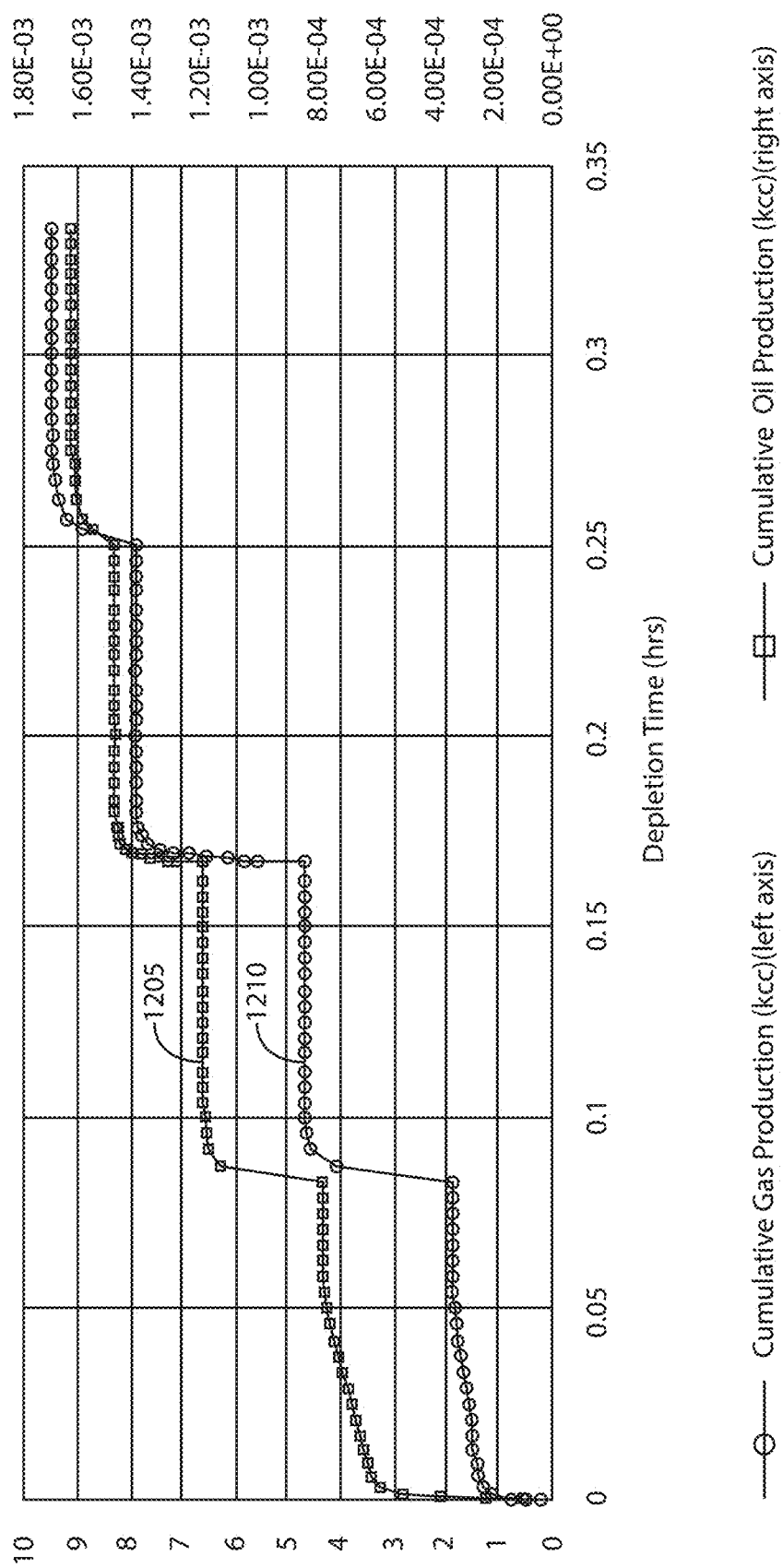
FIG. 12 is a graph showing cumulative oil and gas production from a core sample in a test chamber as the outlet pressure in the test chamber is reduced in steps.

FIG. 12 is a graph showing cumulative oil and gas production from a core sample in a test chamber as the outlet pressure in the test chamber is reduced in steps. The curve 1205 through square data points is cumulative oil production in kilo-cubic centimeters over time and references the left horizontal axis. The curve 1210 through round data points is cumulative gas production in kilo-cubic centimeters over time and references the right horizontal axis.

Figure 13:
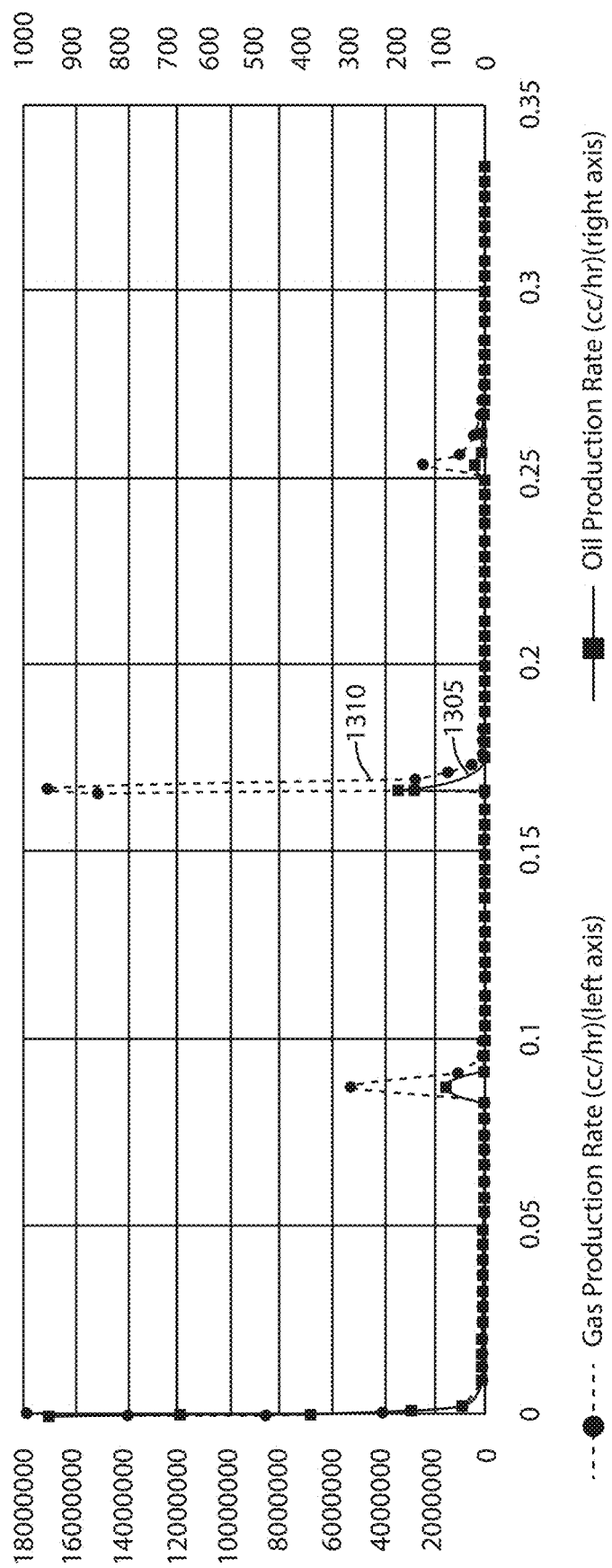
FIG. 13 is a graph showing oil and gas production rate from a core sample in a test chamber as the outlet pressure in the test chamber is reduced in steps.

FIG. 13 is a graph showing oil and gas production rate from a core sample in a test chamber as the outlet pressure in the test chamber is reduced in steps. The solid curve 1305 through square data points is the oil production rate in cubic centimeters per hour over time and references the right horizontal axis. The dashed curve 1310 through round data points is the gas production rate in cubic centimeters per hour over time and references the left horizontal axis.

To gather this data, a core sample 705 containing formation fluids is retrieved from a COREVAULT® tool's pressure vessel and placed in the test fixture 715, as shown in FIG. 7. The initial pressure in the test fixture 715 is set to 4000 psi. The valve 730 is opened at 0 minutes to reduce the outlet pressure measured by output pressure sensor 750 to 3000 psi, at 5 minutes (0.08 hours on FIG. 12) to reduce the outlet pressure to 2000 psi, at 10 minutes (0.16 hours on FIG. 12) to reduce the outlet pressure to 1000 psi, and 15 minutes (0.25 hours on FIG. 12) to reduce the outlet pressure to 500 psi. Each time the pressure is reduced, additional oil, indicated by curve 1205, and additional gas, indicated by curve 1210, is released through the valve 730. The rate of production, indicated by curves 1305 and 1310, also increases at the times that the valve 730 is opened, as can be seen in FIG. 13. The released gas and oil are analyzed to determine their chemical components. The time-series production data in the curves 1205, 1210 and in the analyzed chemical components of the released gas and oil may be stored in the data analytics model 245 (see FIG. 2) and can be used as input data to the historical deep RNN model 210.

FIG. 14 is a table showing the model parameters listed in FIG. 5 with the addition of a base value for each model parameter. The sensitivity of the model parameters shown in FIG. 5 is analyzed using the arrangement shown in FIGS. 1 and 2, and base values, shown in the table in FIG. 14, are recorded for each of the model parameters are recorded in the data analytics model 245.

The parameters considered in the sensitivity analysis include the triple porosity and permeability values, the Langmuir volume and Langmuir pressure of absorbed components, and the shape factor between permeability types.

Figure 15:
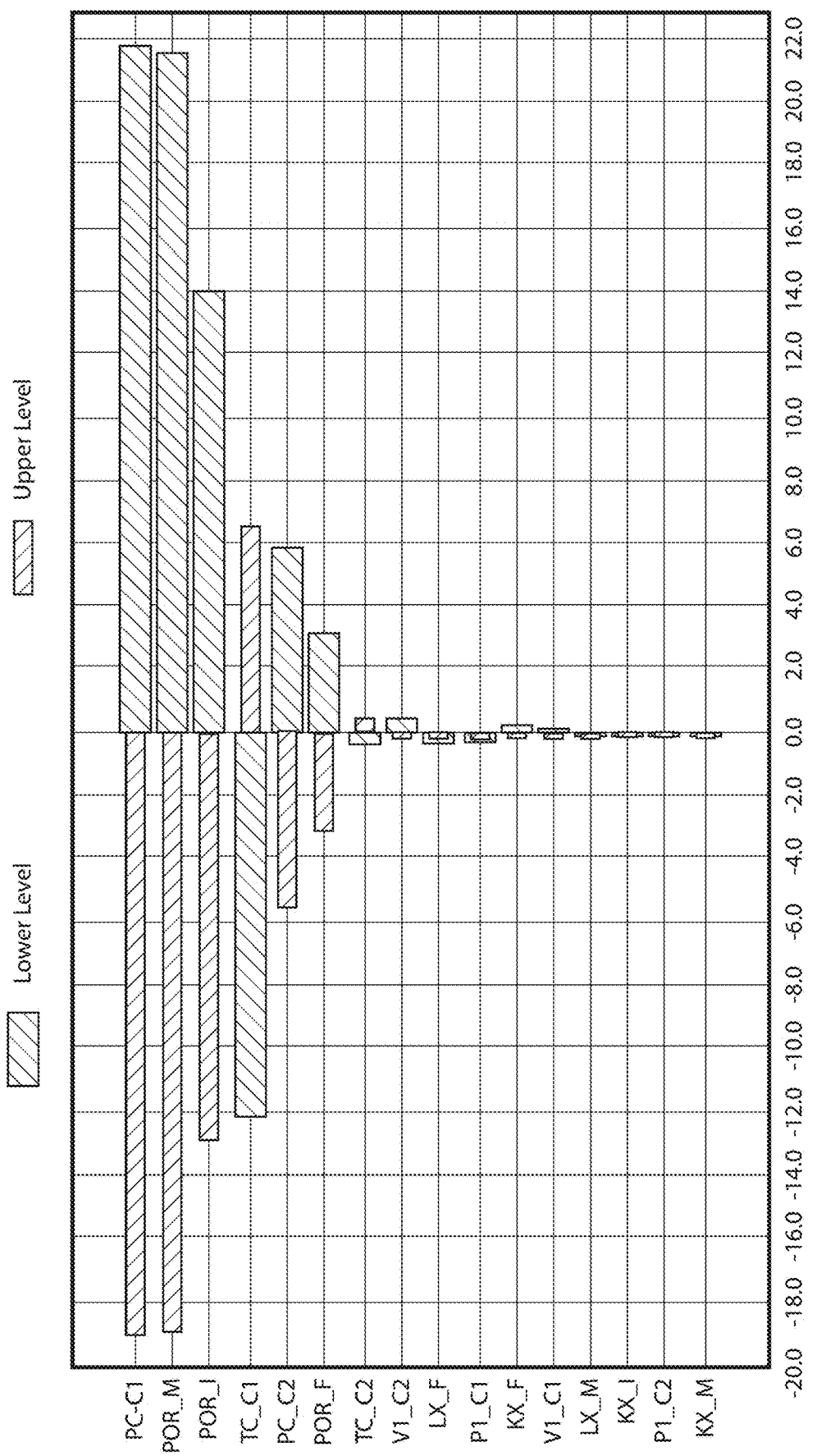
FIG. 15 is a bar chart showing results of a sensitivity analysis for cumulative gas production.

FIG. 15 is a bar chart showing results of a sensitivity analysis for cumulative gas production. Each bar represents the sensitivity of the cumulative production of gas to a change in the corresponding variable along the left vertical axis. The bars with cross-hatching from the upper left to the lower right are for the upper level and the bars with cross-hatching from the lower left to the upper right are for the lower level. As can be seen, the most sensitive parameters for cumulative gas production are PC_C1, POR_M, POR_I, TC_C1, PC_C2, and POR_F. These are the significant parameters for gas production.

Figure 16:
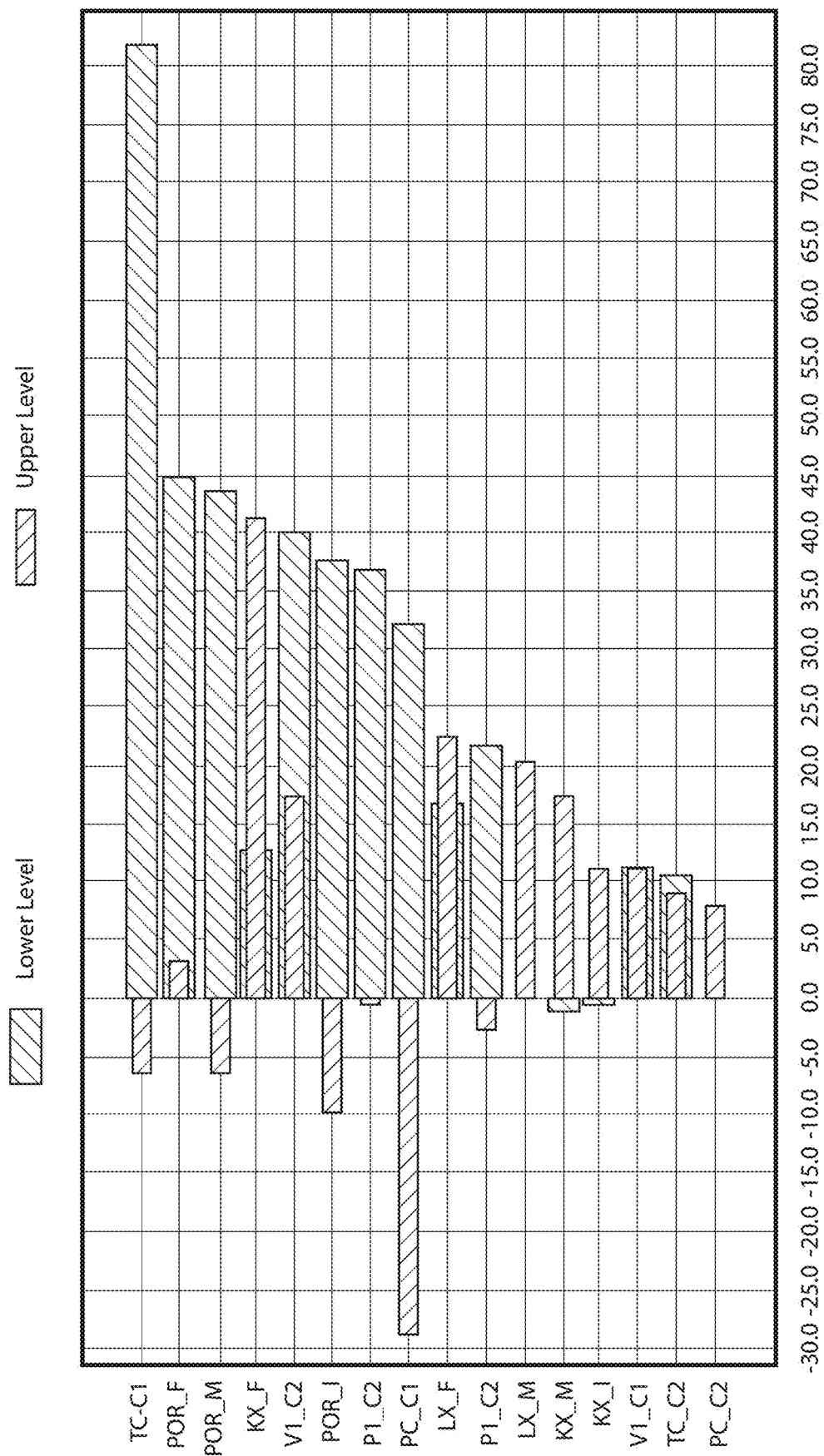
FIG. 16 is a bar chart showing results of a sensitivity analysis for cumulative oil production.

FIG. 16 is a bar chart showing results of a sensitivity analysis for cumulative oil production. Each bar represents the sensitivity of the cumulative production of oil to a change in the corresponding variable along the left vertical axis. The bars with cross-hatching from the upper left to the lower right are for the upper level and the bars with cross-hatching from the lower left to the upper right are for the lower level. As can be seen, the most sensitive parameter is TC_C1. This is the significant parameter for oil production.

Production can be optimized based on the identified significant parameters. For example, if it is determined that one or more of the porosity parameters is a significant parameter, it may be decided that hydraulic fracturing should be attempted as a production enhancement procedure. As another example, if it is determined that the natural fracture permeability is a significant parameter and the reservoir is a Carbonate reservoir, matrix acidizing is preferable over hydraulic fracturing since it already naturally fractured.

Figure 17:
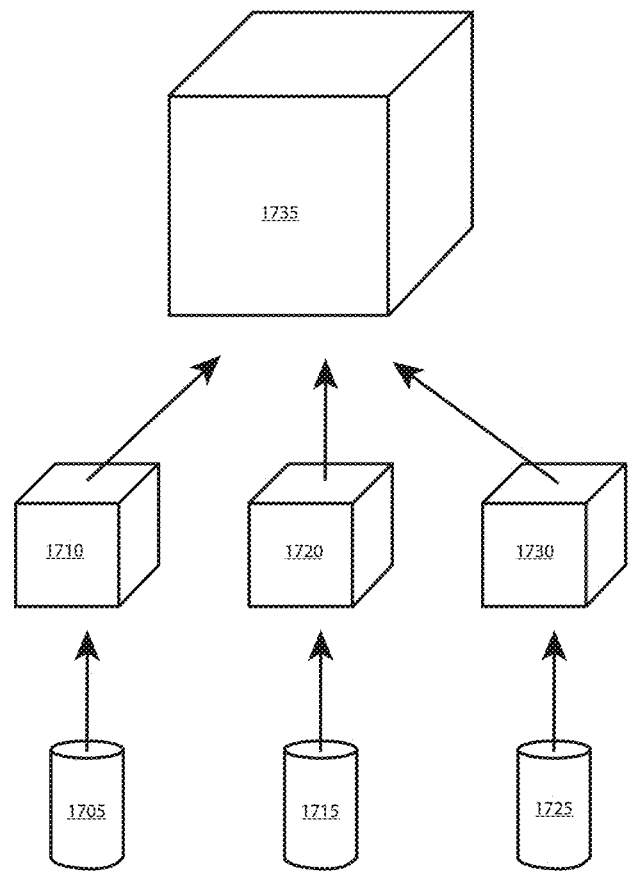
FIG. 17 is a diagram illustrating upscaling from core samples to a model.

FIG. 17 is a diagram illustrating upscaling from core samples to a model. The core base reservoir model can be upscaled to a field scale model to match production at every scale in the model. For example, as shown in FIG. 17, a core model 1705 can be upscaled through conventional upscaling techniques to a model for a reservoir sub-volume 1710. Similarly, a core model 1715 can be upscaled to a model for a reservoir sub-volume 1720 and a core model 1725 can be upscaled to a model for a reservoir sub-volume 1730. The reservoir sub-volumes 1710, 1720, 1730 can be upscaled, perhaps through additional layers of upscaling to a full reservoir model 1735.

In one aspect, a method includes storing historical information about a significant input parameter in a data analytics model of a hydrocarbon reservoir. The method includes building a historical deep recursive neural network (RNN) model based on time-series production data from the hydrocarbon reservoir as a function of the significant input parameter in the data analytics model. The method includes storing the historical deep RNN neural network model on a data storage device. The method includes designing an experiment using the historical deep neural network model to predict the significant input parameter. The method includes running the experiment to produce a significant experimental input parameter. The method includes comparing the significant experimental input parameter to the significant input parameter stored in the data analytics model to determine a difference. The method includes adjusting the data analytics model to reduce the difference.

Implementations may include one or more of the following. The method may include building a predictive deep RNN neural network model to generate adjustments to the data analytics model as a function of the significant experimental input parameter. Adjusting the data analytics model to reduce the difference may include running the experimental input parameter through the predictive deep neural network to produce a data analytics adjustment. The method may include using the data analytics adjustment to adjust the data analytics model. The method may include running a sensitivity analysis to identify the significant input parameter. The method may include collecting the time-series production data used to build the historical deep RNN model from a core sample collected from the hydrocarbon reservoir. The method may include upscaling the data collected from the core sample to estimate the parameters for a sub-volume of the hydrocarbon reservoir. Collecting the time-series production data may include placing the core sample, having an input side and an output side, in a test fixture. The test fixture may have an input side into which the input side of the core sample extends, an output side into which the output side of the core sample extends, and a valve through which pressure and fluids can be vented from the output side of the test fixture. The method may include pressuring the test fixture so that the pressure on the input side of the test fixture is the same as the pressure on the output side of the test fixture. The method may include opening the valve, allowing the pressure on the output side of the test fixture to drop. The method may include closing the valve so that the output side of the test fixture repressurizes from the input side of the test fixture through the core sample. The method may include recording the pressure on the output side of the test fixture as the time-series production data as the output side of the test fixture repressurizes. Opening the valve may allow fluid from the core sample to escape the test fixture. The method may include analyzing the fluid from the core sample to determine its chemical components and storing the analysis as a portion of the time-series production data. The historical deep RNN model may include a long short-term memory (LSTM) cell.

In one aspect, a system includes a data analytics model of a hydrocarbon reservoir containing historical information about a significant input parameter for the hydrocarbon reservoir. The system includes a historical deep RNN model stored on a data storage device and coupled to the data analytics model used to run experiments from a Design of Experiments (DOE) to identify and predict a significant experimental input parameter for the hydrocarbon reservoir. The system includes a computer-based process to find a difference between the significant experimental input parameter and the significant input parameter and to adjust the data analytics model to reduce the difference.

Implementations may include one or more of the following. The process to find the difference between the significant experimental input parameter and the significant input parameter may include a predictive deep RNN model. The historical deep RNN model may include an input, a first LSTM cell coupled to the input, a second LSTM cell coupled to the first LSTM cell, and an output coupled to the second LSTM cell. The first LSTM cell may include, as inputs, cell state and output production from a previous time state t−1, a parameter of a hydrocarbon reservoir for a current time state t. The first LSTM cell may include, as outputs, cell state and output production for the current time state t.

In one aspect, a non-transitory computer-readable medium includes a computer program. The computer program include executable instructions, that, when executed, perform a method. The method includes storing historical information about a significant input parameter in a data analytics model of a hydrocarbon reservoir. The method includes building a historical deep recursive neural network (RNN) model based on time-series production data from the hydrocarbon reservoir as a function of the significant input parameter in the data analytics model. The method includes designing an experiment using the historical deep neural network model to predict the significant input parameter. The method includes running the experiment to produce a significant experimental input parameter. The method includes comparing the significant experimental input parameter to the significant input parameter stored in the data analytics model to determine a difference. The method includes adjusting the data analytics model to reduce the difference.

Implementations may include one or more of the following. The method may include building a predictive deep RNN model to generate adjustments to the data analytics model as a function of the significant experimental input parameter. Adjusting the data analytics model to reduce the difference may include running the experimental input parameter through the predictive deep neural network to produce a data analytics adjustment. The method may include using the data analytics adjustment to adjust the data analytics model. The method may include running a sensitivity analysis to identify the significant input parameter. The method may include collecting the time-series production data used to build the historical deep RNN model from a core sample collected from the hydrocarbon reservoir. The method may include upscaling the data collected from the core sample to estimate the parameters for a sub-volume of the hydrocarbon reservoir. Collecting the time-series production data may include placing the core sample, having an input side and an output side, in a test fixture. The test fixture may have an input side into which the input side of the core sample extends, an output side into which the output side of the core sample extends, and a valve through which pressure and fluids can be vented from the output side of the test fixture. The method may include pressuring the test fixture so that the pressure on the input side of the test fixture is the same as the pressure on the output side of the test fixture. The method may include opening the valve, allowing the pressure on the output side of the test fixture to drop. The method may include closing the valve so that the output side of the test fixture re-pressurizes from the input side of the test fixture through the core sample. The method may include recording the pressure on the output side of the test fixture as the time-series production data as the output side of the test fixture re-pressurizes. Opening the valve may allow fluid from the core sample to escape the test fixture. The method may include analyzing the fluid from the core sample to determine its chemical components and storing the analysis as a portion of the time-series production data. The historical deep RNN model may include a long short-term memory (LSTM) cell.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   forming a data analytics model of a hydrocarbon reservoir, wherein the data analytics model produces a significant input parameter;
   building a historical deep recursive neural network (RNN) model based on time-series production data from the hydrocarbon reservoir;
   storing the historical deep RNN model on a data storage device;
   designing an experiment to produce a significant experimental input parameter;
   inputting an output from the historical deep RNN into the experiment;
   running the experiment to produce the significant experimental input parameter;
   comparing the significant input parameter to the significant experimental input parameter stored in the data analytics model to produce a difference between the significant input para meter and the significant experimental input parameter; and
   adjusting the significant experimental input parameter of the data analytics model to reduce the difference.

2. The method of claim 1 further comprises:
building a predictive deep RNN model to generate adjustments to the data analytics model as a function of the significant experimental input parameter;
wherein adjusting the data analytics model comprises running the experimental input parameter through the predictive deep neural network to produce a data analytics adjustment; and
using the data analytics adjustment to adjust the data analytics model.

3. The method of claim 1 further comprising:
running a sensitivity analysis to identify the significant input parameter.

4. The method of claim 1 further comprising:
collecting the time-series production data used to build the historical deep RNN model from a core sample collected from the hydrocarbon reservoir.

5. The method of claim 4 further comprising:
upscaling the data collected from the core sample to estimate the para meters for a sub-volume of the hydrocarbon reservoir.

6. The method of claim 1 wherein collecting the time-series production data comprises:
placing the core sample, having an input side and an output side, in a test fixture, the test fixture having:
an input side into which the input side of the core sample extends,
an output side into which the output side of the core sample extends, and
a valve through which pressure and fluids can be vented from the output side of the test fixture;
pressuring the test fixture so that the pressure on the input side of the test fixture is the same as the pressure on the output side of the test fixture;
opening the valve, allowing the pressure on the output side of the test fixture to drop;
closing the valve so that the output side of the test fixture re-pressurizes from the input side of the test fixture through the core sample; and
recording the pressure on the output side of the test fixture as the time-series production data as the output side of the test fixture re-pressurizes.

7. The method of claim 6 wherein:
opening the valve allows fluid from the core sample to escape the test fixture, and
wherein the method further comprises analyzing the fluid from the core sample to determine its chemical components and storing the analysis as a portion of the time-series production data.

8. The method of claim 1 wherein:
the historical deep RNN model comprises a long short-term memory (LSTM) cell.

9. A system comprising:
a data analytics model of a hydrocarbon reservoir wherein the data analytics model produces a significant input parameter;
a historical deep RNN model stored on a data storage device and coupled to the data analytics model used to run experiments from a Design of Experiments (DOE), wherein an output from the historically deep RNN is input into the DOE to identify and predict a significant experimental input para meter for the hydrocarbon reservoir;
a computer-based process to produce a difference between the significant experimental input parameter and the significant input parameter; and
to adjust the significant experimental input parameter of the data analytics model to reduce the difference.

10. The system of claim 9 wherein the process to adjust the data analytics model comprises a predictive deep RNN model.

11. The system of claim 9 wherein the historical deep RNN model comprises: an input,
a first LSTM cell coupled to the input,
a second LSTM cell coupled to the first LSTM cell,
and an output coupled to the second LSTM cell.

12. The system of claim 11 wherein the first LSTM cell comprises: as inputs:
cell state and output production from a previous time state t−1,
a parameter of a hydrocarbon reservoir for a current time state t, and as outputs:
cell state and output production for the current time state t.

13. A non-transitory computer-readable medium on which is recorded a computer program, the computer program comprising executable instructions, that, when executed, perform a method comprising:
forming a data analytics model of a hydrocarbon reservoir, wherein the data analytics model produces a significant input parameter;
building a historical deep recursive neural network (RNN) model based on time-series production data from the hydrocarbon reservoir;
designing an experiment to produce a significant experimental input parameter;
inputting an output form the historical deep RNN into the experiment;
running the experiment to produce the significant experimental input parameter;
comparing the significant input parameter to the significant experimental input parameter stored in the data analytics model to produce a difference between the significant input para meter and the significant experimental input parameter; and
adjusting the significant experimental input parameter the data analytics model to reduce the difference.

14. The computer-readable medium of claim 13, wherein the method further comprises:
building a predictive deep RNN model to generate adjustments to the data analytics model as a function of the significant experimental input parameter,
wherein adjusting the data analytics model comprises running the experimental input parameter through the predictive deep neural network to produce a data analytics adjustment; and
using the data analytics adjustment to adjust the data analytics model.

15. The computer-readable medium of claim 13, wherein the method further comprises: running a sensitivity analysis to identify the significant input parameter.

16. The computer-readable medium of claim 13, wherein the method further comprises:
collecting the time-series production data used to build the historical deep RNN model from a core sample collected from the hydrocarbon reservoir.

17. The computer-readable medium of claim 16, wherein the method further comprises:
upscaling the data collected from the core sample to estimate the para meters for a sub-volume of the hydrocarbon reservoir.

18. The computer-readable medium of claim 13, wherein collecting the time-series production data comprises:

placing the core sample, having an input side and an output side, in a test fixture, the test fixture having:
  an input side into which the input side of the core sample extends,
  an output side into which the output side of the core sample extends, and
  a valve through which pressure and fluids can be vented from the output side of the test fixture;
pressuring the test fixture so that the pressure on the input side of the test fixture is the same as the pressure on the output side of the test fixture;
opening the valve, allowing the pressure on the output side of the test fixture to drop;
closing the valve so that the output side of the test fixture re-pressurizes from the input side of the test fixture through the core sample; and
recording the pressure on the output side of the test fixture as the time-series production data as the output side of the test fixture re-pressurizes.

19. The computer-readable medium of claim 18, wherein:
opening the valve allows fluid from the core sample to escape the test fixture, and
wherein the method further comprises analyzing the fluid from the core sample to determine its chemical components and storing the analysis as a portion of the time-series production data.

20. The method of claim 13 wherein:
the historical deep RNN model comprises a long short-term memory (LSTM) cell.

\* \* \* \* \*